3,459,404
SOLENOID VALVE
Arthur John Wisniewski, 25631 Friar Lane,
Southfield, Mich. 48076
Filed Feb. 3, 1967, Ser. No. 613,955
Int. Cl. F16k 51/00; F16l 29/00
U.S. Cl. 251—141                    1 Claim

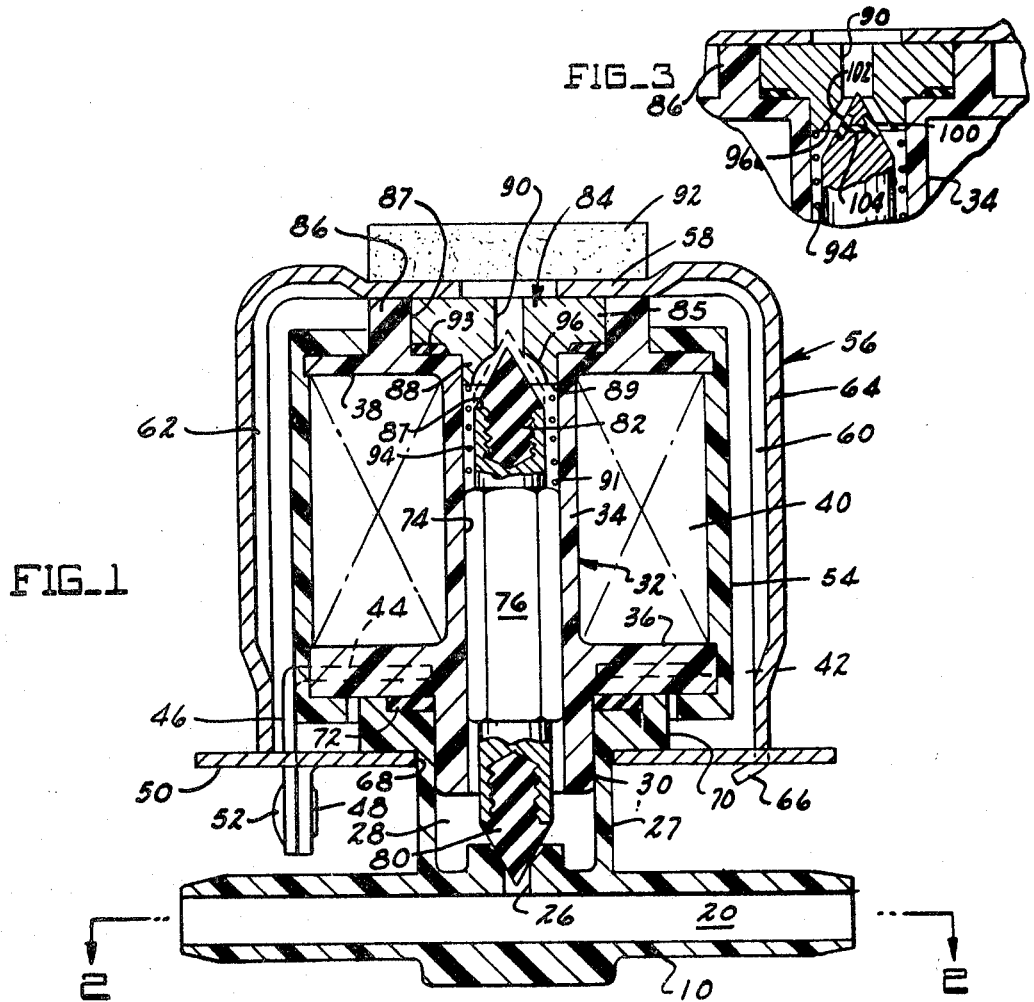

ABSTRACT OF THE DISCLOSURE

This invention relates to solenoid valves, particularly miniature gas control valves having tight-seating characteristics.

The principal feature of the invention is the addition of a novel pole piece to an otherwise conventional valve to provide improved magnetic pull with a given size solenoid coil. An additional feature is an economical pole piece-armature relationship whereby different air flows can be handled without change in the magnetic air gap between the armature and pole piece.

CROSS REFERENCE TO RELATED APPLICATIONS

The applications to which the present invention are most closely related are now U.S. Patents 3,013,768 and 3,263,959.

BACKGROUND OF THE INVENTION

This invention is particularly useful for electrically controlling small flows of air (e.g. 1 c.f.m.) in vacuum or pressure systems, as for example in certain pneumatic control systems used in vehicle speed controls and vehicle air conditioner controls. Other uses of the valve are possible.

SUMMARY

The invention contemplates a low cost miniature solenoid valve wherein the armature plunger is slidably arranged in direct contact with the interior surface of a solenoid spool, said spool being formed to accurately locate a magnetically permeable pole piece with reference to the armature axis, whereby the armature tip is ensured of tightly engaging a flow aperture in the pole piece when the coil is energized.

THE DRAWINGS

FIG. 1 is a sectional view taken through a solenoid valve constructed according to the invention.

FIG. 2 is a sectional view taken on line 2—2 in FIG. 1.

FIG. 3 is a fragmentary view showing a plunger-pole piece arrangement used in another embodiment of the invention.

GENERAL ARRANGEMENT IN DETAIL

FIG. 1 illustrates a valve constructed generally similarly to the valves shown in U.S. Patent 3,263,959, assigned to the assignee of the present invention. Thus, there is shown a valve body 10 formed of thermoplastic such ase nylon, and comprising a main body portion 12 having three tubular projections 14, 16 and 18 extending therefrom. In service, tubular portion 14 can be connected with a source of vacuum via a length of plastic or other material tubing inserted onto the tubular portion; tubular portion 16 can have a length of plastic or other flexible material tubing inserted thereon to connect the valve with a second valve (not shown). The defined passage 20 thus serves as a manifold for connecting a plurality of valves to a common vacuum source.

Tubular portion 18 can have a length of tubing slipped thereover to form a connection with a device to be vacuum-controlled. As will be seen from FIG. 2, the common passage 20 formed within tubular portions 14 and 16 is isolated from passage 22 formed within tubular portion 18 by means of an upstanding semicircular partition 24 having a seat-forming port 26 formed therethrough. Body portion 12 includes a circular sleeve-like portion 26 defining a chamber 28 which communicates with passage 22 around the outside of partition 24.

Sleeve 27 forms a socket for telescopically receiving a tubular extension 30 formed integrally with solenoid spool 32. As shown in FIG. 1, spool 32 comprises a central hollow tubular portion 34 and two outwardly radiating end flanges 36 and 38, an insulated coil for electrical winding 40 being trained around tubular portion 34 to cooperate with member 32 in defining the solenoid. Suitable metallic spade-like terminals 42 and 44 may be inserted in slots within flange 36 for connection (as by soldering and/or wrapping) with the ends of coil 40. Terminal 44 is equipped with a downwardly projecting extension 46 which mates with and engages a downwardly projecting portion 48 of a grounded metallic mounting plate 50, a firm electrical connection being established by a rivet 52. Plate 50 may be bolted to the frame of a vehicle to mount the valve and provide an electrical ground. The arrangement enables D.C. current from a suitable source, such as a 12 volt battery, to flow into terminal 42, through winding 40, and out to ground via terminal 44, projection 48 and plate 50.

Preferably the electrical winding is protected against the short-circuiting effects of high humidity ambients by encapsulating the coil with a dielectric sheath, one suitable sheath configuration being shown at 54. The sheath and spool may be formed of the same or different thermoplastic dielectric materials, such as nylon or epoxy. Preferably the sheath is formed by positioning the wound spool 32 within a mold cavity, injecting a molten plastic under pressure into the cavity, and cooling the cavity to cure or solidify the sheath material.

Retention of the solenoid coil on the valve body may be conveniently effected by a magnetically permeable frame 56, formed for example of cadmium plated cold rolled steel. As shown in FIG. 1 the frame has a U-shaped configuration comprising a web 58, a right end flange 60 and a left end flange 62. Portions of the frame are ribbed, as at 64 to reinforce the frame against bending or twisting when the frame is secured to mounting plate 50. A convenient way to secure the frame and mounting plate together is to form tabs 66 on the lower edge of each flange 62 or 64, to extend the tabs through slot-like openings in plate 50, and to then bend or crimp the tabs at acute angles to the plate.

Plate 50 is preferably provided with a U-shaped opening 68 extending inwardly from one of its lateral edges to permit the plate to be slid onto the tubular portion 26 of the valve body in a location underlying the valve body flange 70. A suitable annular elastomeric seal 72 may be positioned in a recess in the upper face of flange 70 to engage the lower face of the spool flange 36, for thus sealing the spool-valve body joint.

Tubular portion 34 of spool 32 is formed with a cylindrical internal surface 74 constituting a guide surface for the armature plunger 76, said plunger having a hexagonal or other non-circular cross section whereby gas or other fluid can flow in the segmental spaces between the plunger and guide surface. A lower cylindrical end portion of the plunger is formed with internal threads which serve to lock an elastomeric tip 80 on the armature. Similarly an upper cylindrical end portion of the plunger is formed with internal threads to lock an elastomeric tip 82 on the plunger. Cooperating with plunger 76 is a disk-like pole piece 84 formed for example of stainless steel, 400 series. An upper cylindrical portion 85 of the pole piece lies outside spool flange 38 within a cylindrical cavity 87 formed by an annular protuberence or boss 86 formed integrally with spool 32. A lower cylindrical portion 88 of the pole piece fits within the upper portion of the cylindrically contoured guide surface 74. Formed in the lower face of the disk portion 82 is a peripheral recess which accommodates an elastomeric seal ring 93. Retention of the pole piece against the seal ring is effected by the overlying wall portion 58 of frame 56.

As shown in FIG. 1, the pole piece has a central port or flow aperture 90 formed therethrough to allow air or other fluid to flow through passageway 74 when armature 76 is in its illustrated position. In the illustrated valve port 90 is protected from external dirt, oil, or other ambient contaminant by means of a disk-like filter 92, formed for example of open celled polyurethane foam. The lower face of the filter disk may be provided with a pressure sensitive adhesive ring for its adherence on the flattened central portion of frame wall 58.

In an illustrative use of the valve the aforementioned tubular portion 14 may be connected with a source of vacuum, the tubular portion 16 may be connected with a second non-illustrated valve, and tubular portion 18 may be connected with a device to be vacuum-controlled. When winding 40 is in a non-energized condition armature 76 will be in its illustrated position. The vacuum-controlled device will then be vented to the atmosphere via a passage system which includes passage 22, chamber 28, the spaces between armature 76 and surface 74, port 90, and the pores of filter disk 92. When winding 40 is electrically energized armature 76 will move upwardly so that its elastomeric tip 82 will assume the dotted line position closing port 90. The vacuum-controlled device will then communicate with the vacuum source through a passage system comprising passage 22, chamber 28, port 26, and passage 20. To assist plunger 76 in returning to its illustrated position there may be provided a coil spring 94 trained between the lower face 89 of pole piece 84 and a shoulder 91 formed at the joint between the hexagonal and cylindrical portions of plunger 76.

Magnetic circuit

The magnetic flux path in the illustrated valve comprises armature 76, pole piece 84, frame 56, and plate 50. The point at which the flux should be relatively high is the air gap between the armature and pole piece; this is the space between armature end face 87 and pole piece face 89.

It is known that most efficient magnetic action or magnetic pull is achieved when the flux is flowing in an axial or substantially axial direction, as differentiated from a radial diffusion type pattern. In the illustrated valve the air gap between surfaces 87 and 89 is primarily axial in nature so that the magnetic flux flows substantially axially as it traverses the gap; preferably disk portion 88 extends within the space circumscribed by windings 40 to help make a shorter more concentrated flux path. Additional improvement in flux concentration is achieved because the solenoid spool is used as an armature guide surface; this eliminates the conventional guide tube and makes for a more complete flux occupancy in the space within the winding. As a result the flux concentration at surface 87 is somewhat increased. The combination of structural features causes the flux to be a concentrated axial flux in contrast to a less effective radially diffusing flux.

Preferably the flux concentration in parts of the circuit remote from the armature-pole piece gap should be relatively low to avoid saturation and undesired flux resistances. Therefore in the illustrated valve the pole piece is provided with a thickened relatively large diameter portion 85 which diffuses the concentrated flux in disk portion 88. The disk enjoys an extensive area contact with the lower face of frame wall 58 to further reduce flux losses.

Coil design in relation to orifice area

The resistance to movement of plunger 76 is determined largely by the size of orifice 90. If the orifice has a relatively small diameter the pressure differential across the orifice will produce a relatively small force necessary to be overcome by the coil in moving the plunger between its two positions. If the orifice has a larger diameter the force-producing requirements of the coil will be correspondingly increased. The valve is accordingly constructed with a sufficient number of turns 40 to provide the necessary armature lift to suit all port 90 diameters corresponding to a range of flow capacities, as for example .25 c.f.m. up to 1.25 c.f.m. One advantage of the illustrated pole piece arrangement (mounted directly on the spool) is that the gap between the pole piece and armature is the same whatever the port size. Thus, the spacing between surfaces 87 and 89 is constant whatever the diameter of orifice 90. As a result a range of different flow capacity valves can be produced merely by varying the size of orifice 90.

In connection with the force requirements of the coil, it should be noted that the conical elastomeric tipped armature has a wedge fit within the orifice such that only the elastomeric material within the orifice outline is subjected to fluid pressure differential. The portions of the elastomeric tip beyond the orifice 90 diameter are continually subjected to the pressure within the chamber defined by guide surface 74, and the seat area of the elastomer does not increase the area subjected to pressure differential. The conical or convergent elastomeric tipped armature is therefore believed to be a satisfactory mechanism for minimizing the area subjected to pressure differential and thus the force requirements of the coil. The convergent tip also has some advantageous features in regard to improved tight sealing, since the elastomer material tends to wedge into the seat and compensate for any surface irregularities, non-roundness or non-concentricity. If the elastomeric tip has too much convergence it will however tend to stick in the up position, particularly if the material has a low durometer. Preferably the rubber has a durometer of about 60 and an included angle of about 60 radial degrees. As shown in the drawing, the pole piece preferably is cut away or hollowed out at 96 to enable the elastomeric surface to make point contact with orifice 90 irrespective of the orifice diameter which may be chosen for a given application. Preferably the hollowing should be as little as possible to allow surface 89 to have as extensive an area as possible.

For proper seating of elastomaric tip 82 against port 90 the pole piece must be substantially exactly centered with respect to the axis of guide surface 74. This axial centering can be accomplished by manufacturing the valve so that either surface 87 or surface 74 is used as a locating surface. If surface 74 is used as a locating surface the disk portion 88 will have a tight or press fit in surface 74, while the larger disk portion 85 will have a clearance fit with respect to surface 87. Thus, if the internal diameter of surface 74 has a nominal value of .178 inch and a tolerance of plus or minus .003 inch, the outer diameter of disk portion 88 can be .183 inch, with a tolerance of plus or minus .002 inch. The pole piece can thus be driven or tamped into bore 74 with the assurance that the disk opening 90 will be concentric with the axis of bore 74; this assumes that the pole piece is preformed with concentricity between opening 90 and the outer surface of disk portion 88.

As previously noted, concentricity between port 90 and the plunger guide surface 74 can also be provided by using surface 87 as a locating surface for the pole piece. In this case the disk portion 88 would have a clearance fit within bore surface 74.

The valve of this invention has been designed primarily as a low cost miniature valve for controlling relatively small air flows in the range of 1 c.f.m. flowing under vacuum forces. Sizewise an illustrative valve has been built with frame walls 60 and 62 spaced about .9 inch apart, and with the armature having a length of about .9 inch. Presumably however the valve design could be utilized in larger size ranges.

FIG. 3 embodiment

The embodiment shown fragmentarily in FIG. 3 utilizes an armature which is magnetically permeable except for an annular ring-like elastomeric portion 100. The elastomeric ring may be snapped into or otherwise positioned within a groove in the end surface of plunger 76 to provide a flat annular external surface 102 aligned with the seat defined by orifice 90. Retention of member 100 on the plunger may at some added cost be enhanced by molding the elastomeric element around the plunger so that part of the elastomeric material flows into a transverse passage 104 formed in the plunger. Alternately as noted above, a ring of elastomeric may be snap-fitted into a recessed groove machined on the armature tip.

FIG. 3 illustrates a pole piece in which the hollow surface 96a is frusto-conical instead of spherical as in the case of surface 96 (FIG. 1). The included angle of convergence of surface 96a is desirably somewhat greater than the included angle of surface 102 to enable the rubber surface to seat correctly on the edge of orifice 90 whatever its chosen diameter.

It is claimed:
1. A solenoid valve comprising an electrical coil, an armature plunger slidably arranged within the coil, and a magnetically permeable field means located to attract the armature thereto when the coil is energized;

said coil comprising a dielectric spool having a hollow tubular portion and first and second outwardly radiating end flanges, and an electrical winding trained about the hollow tubular portion in the space between the flanges; the interior surface of the spool tubular portion constituting a guide surface for the armature plunger; said dielectric spool having an annular boss formed integrally with the spool as an axial protuberance from said first flange;

said field means comprising an axially thickened disk of magnetically permeable material, said disk having a relatively small diameter portion fitting within the spool tubular portion, and a relatively large diameter portion fitting within the space circumscribed by the annular boss; said disk having a flow passage extending therethrough concentric with the spool axis; said field means further including a frame of magnetically permeable material encircling the coil, said frame having one wall thereof overlying the aforementioned disk so that said one wall has facial engagement with the exposed face of the disk;

said armature plunger having a relatively large diameter main body portion slidably engaged with the interior surface of the spool, and a reduced diameter end portion connected with said main body end portion to form a shoulder; the valve further comprising a compression coil spring trained between the disk and shoulder in surrounding relation to the reduced diameter end portion of the plunger;

said armature plunger having a frusto-conical tip of elastomeric material aligned with the flow passage, whereby the elastomeric surface enjoys a wedge fit within the annular surface defined by the flow passage when the armature is attracted to the disk; the end face of the disk presented to the plunger having a concavity therein concentric with the disk axis; the included angle of said concavity being greater than that of the frusto-conical tip, whereby the tip enjoys line contact with the disk at the juncture between the flow passage and disk end face.

References Cited

UNITED STATES PATENTS

| 3,013,768 | 12/1961 | Mastra | 251—129 |
| 3,263,959 | 8/1966 | Wisniewski | 251—141 |
| 3,377,046 | 4/1968 | Frantz et al. | 137—625.65 XR |
| 3,080,889 | 3/1963 | Noakes | 137—625.65 |

FOREIGN PATENTS

| 889,987 | 2/1962 | Great Britain. |
| 1,157,871 | 11/1963 | Germany. |

HENRY T. KLINKSIEK, Primary Examiner

ROBERT J. MILLER, Assistant Examiner

U.S. Cl. X.R.

137—625